June 17, 1947. W. H. WANNAMAKER, JR 2,422,273
LENS TYPE RADIATION PYROMETER
Filed Nov. 28, 1942 3 Sheets-Sheet 1

INVENTOR.
WILLIAM H. WANNAMAKER, JR.
BY
ATTORNEY.

INVENTOR.
WILLIAM H. WANNAMAKER, JR.

Patented June 17, 1947

2,422,273

UNITED STATES PATENT OFFICE 2,422,273

LENS TYPE RADIATION PYROMETER

William H. Wannamaker, Jr., Flourtown, Pa., assignor to The Brown Instrument Company, Philadelphia, Pa., a corporation of Pennsylvania Application November 28, 1942, Serial No. 467,215

1 Claim. (Cl. 136—4)

The general object of the present invention is to provide an improved radiation pyrometer.

In many applications of radiation pyrometers, it is desired to measure the temperature of a relatively small object. There are numerous instances, however, where a measure of the temperature of an even smaller object is desired or where an average temperature of a larger object is desired. At times, also, it is desired to view the object through an opening in the furnace wall which is smaller than the object viewed and preferably also smaller than the radiant energy condensing device of the pyrometer. The present invention was devised to meet the requirements of all of these applications.

The radiation pyrometer of the present invention, in one of its important aspects, comprises an instrument which is especially suited to measure the temperature of small objects or surfaces. In another important aspect, the radiation pyrometer of the present invention is of especial utility in measuring surface temperatures of relatively large areas, such for example, as ware temperatures in brick and pottery kilns and checker temperatures in open hearth regenerators or in blast furnace domes. When my radiation pyrometer is so employed, it may be termed a "wide angle" radiation pyrometer. In still another aspect, the radiation pyrometer of my invention has especial usefulness in measuring the temperatures of surfaces of areas intermediate in size. Thus, my radiation pyrometer is universally adaptable to measuring the temperatures of small, intermediate, and large objects or surfaces. It is so adaptable, moreover, without involving any change in calibration or sensitivity of the instrument. The radiation pyrometer of my invention is also characterized in that it is adapted to view large surfaces or objects through an opening in the furnace wall which is smaller in diameter than the surface under measurement and also smaller than the radiant energy condensing device of the pyrometer.

A copending application Serial No. 412,071, filed by Thomas R. Harrison on September 24, 1941, issued into Patent No. 2,357,193 on August 29, 1944, and assigned to the assignee of the present invention discloses a so-called "narrow angle" radiation pyrometer which was designed for the applications first mentioned hereinbefore of measuring the temperature of a relatively small object. This radiation pyrometer is characterized by its rapidity of response without subsequent drift or creep in the measurement obtained and also in its substantial freedom from transient errors tending to be caused by temporary unbalanced temperature relations within the body of the pyrometer during a change in ambient temperature throughout its range of measurement. While this radiation pyrometer is exceptionally suited for making "narrow angle" measurements of the temperatures of objects located at a considerable distance from the pyrometer, it does not adequately answer the requirements demanded in making measurements of the temperatures of small objects or in making "wide-angle" measurements of the same objects positioned closer to the pyrometer. Nor is it adapted to view the object through an opening in the furnace wall which is smaller than the object viewed and smaller than the condensing device or lens of the pyrometer.

It is a specific object of the present invention, therefore, to adapt the radiation pyrometer of the Harrison patent for universal use in making measurements of the temperatures of small objects or for making "narrow-angle" and "wide-angle" measurements of the temperature of the object. It is a specific object also to attain this result without involving any change in calibration or sensitivity of the Harrison radiation pyrometer while at the same time retaining its advantageous operating characteristics. It is an additional object to adapt the Harrison radiation pyrometer for use in viewing the object through an opening in the furnace wall which is smaller than the object viewed and also smaller than the condensing device or lens of the pyrometer.

The radiation pyrometer of the Harrison patent comprises a thermopile arranged in a housing composed of a mass of suitable material and so configured as to exhibit good thermal conduction characteristics for insuring uniformity of temperature throughout the mass. The thermopile is arranged in the housing in such manner that the housing surrounds both the hot and cold thermopile junctions, and in addition, is so arranged that the cold junctions of the thermopile are in good thermal conduction relation with the housing. A temperature responsive winding connected with the thermopile and also arranged in good heat conductive relation with the housing is provided to compensate for variations in the ambient temperature to which the housing is subjected. The said housing is mounted within a cylindrical structure which supports a lens at one end and provides a compartment for binding posts and a suitable place for attaching conduit at the other end. The said housing, the lens, and the outer structure are all arranged in good thermal contact with each other.

The lens utilized in the radiation pyrometer of said patent is one having a relatively long focal length. Such a lens is suitable for making the "narrow angle" measurements for which this instrument was designed. I have discovered, however, that this "narrow angle" instrument may be adapted for making measurements of the temperature of exceedingly small objects by replacing the lens with one of shorter focal length mounted in approximately the same position in the pyrometer. I have further discovered that by properly relating the focal point of the substituted lens relatively to the thermopile and the object under measurement, the Harrison radiation pyrometer so modified is especially suited for making "wide angle" measurements of the temperatures of objects. These results, moreover, are obtained without requiring any change in calibration or in the temperature-E. M. F. values of the radiation pyrometer.

Accordingly, a primary object of the present invention is to adapt the radiation pyrometer of said patent for universal use in making temperature measurements of small objects, or for making "narrow angle" or "wide angle" measurements of objects merely by replacing the lens with another one of proper focal length in substantially the same position.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
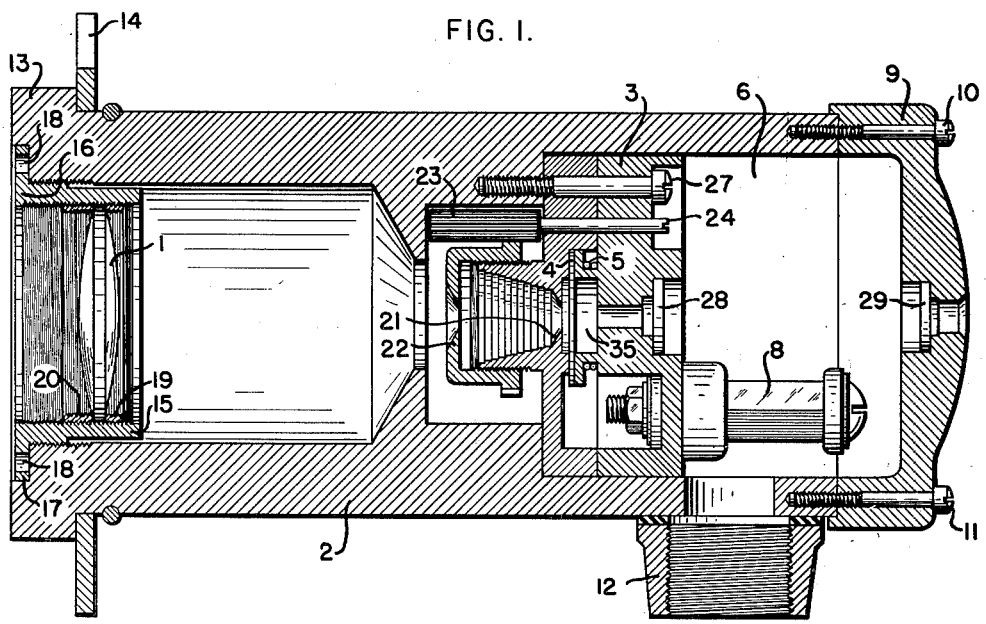
Fig. 1 is a cross-sectional view of a radiation pyrometer embodying the advantageous features of the present invention.

Fig. 1 illustrates a cross-sectional view of a preferred form of radiation pyrometer embodying the novel operating characteristics of my present invention and which is designed to fulfill the requirements of rapidity of response without subsequent drift or creep, substantial freedom from transient errors, freedom from changes in calibration as a result of ambient temperature variations and freedom from changes in calibration with variations in distance factor. The radiation pyrometer of Fig. 1 is intended for measuring temperatures from the lower limit of visible radiation up to the highest encountered in industrial processes. When it is desired to employ the radiation pyrometer of Fig. 1 for measuring the temperatures of small furnaces or of large surfaces, a lens of relatively short focal length is substituted for the lens of relatively long focal length of the radiation pyrometer of said patent. By means of such substitution, the "narrow angle" radiation pyrometer of said patent, having a distance factor of approximately 20:1, may be converted, for example, into a "wide angle" radiation pyrometer having a distance factor of approximately 7:1, and which may also be utilized alternatively for making temperature measurements of small objects. "Distance factor" is a term which is commonly used in expressing the angular field of view of the radiation pyrometer and is the ratio of the distance from the pyrometer to the object to the diameter of the object required for correct calibration of the apparatus. Such conversion is effected, moreover, without requiring any change in calibration of the radiation pyrometer of said patent.

The underlying theory of operation of the radiation pyrometer of Fig. 1 is the same as that of said patent in respect to the arrangement and choice of the various components comprising the radiation pyrometer construction and is given in detail in that patent, and therefore, need not be repeated herein, particularly since such arrangement and choice constitutes no part of my present invention. My invention resides in the adaptation of the radiation pyrometer of said patent to universal application wherein it is desired to measure the temperatures of small objects or the temperatures of intermediate or relatively large objects and is accomplished by utilizing a lens of proper focal length for the lens of said patent.

Figure 4:
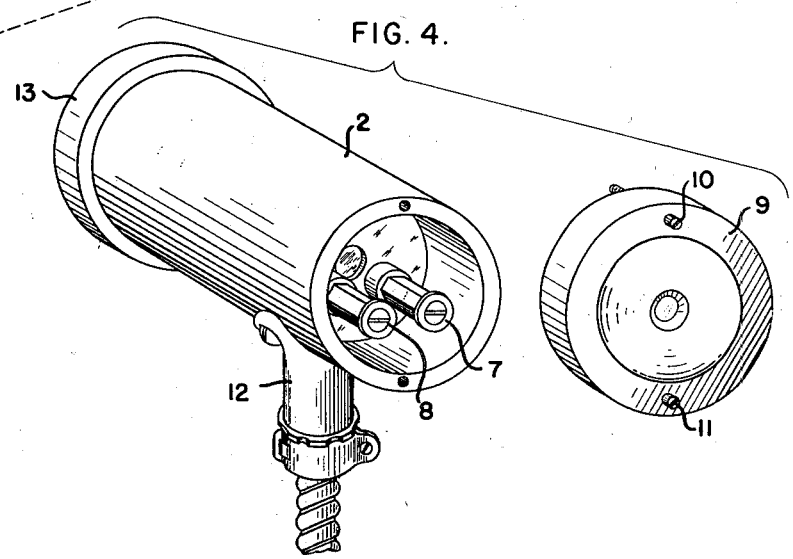
Figs. 4 and 5 are views showing the external appearance of the radiation pyrometer shown in Figs. 1–3.

The structural arrangement of the radiation pyrometer shown in Fig. 1, comprises an external housing 2 in the left end of which a lens 1 is positioned, in the center of which a subhousing 3 containing a thermopile 4 and an ambient temperature compensator 5 is located, and at the right end of which a terminal compartment 6 is provided. The focal length of the lens 1 is chosen in accordance with the desired angular field of view of the pyrometer. Binding posts 7 and 8 are contained within the terminal compartment 6, as shown in Fig. 4, and a terminal compartment cover 9 is provided for said compartment. The compartment cover 9 is attached to the external housing 2 by screws 10 and 11, and therefore, the compartment cover 9 may be detached from the external housing 2 by removing the screws 10 and 11 to thereby permit easy access to the binding posts 7 and 8. An internally threaded conduit fitting 12 which provides an opening into the terminal compartment 6 is also provided at the right end of the housing 2 for facilitating the attaching of conduit to the housing. In addition, a mounting flange 13 is provided at the left or front end of the housing 2 to adapt the pyrometer for use with any one of a group of accessories suited to various industrial applications. A mounting ring 14, disposed in cooperative relation with the flange 13, may also be utilized in conjunction with such mounting accessories.

The lens 1 is supported by a cylindrical member 15 which is threaded both internally and externally and screws into the internally threaded front or left end of the housing 2. The member 15 is provided for axially adjusting the position of the lens 1 towards or away from thermopile 4 as required to obtain the optimum conditions of operation, and is provided with a flange 16 which fits into a recess 17 in the front end of the housing 2. Holes 18 are provided in the flange 16 to facilitate screwing the member 15 into and out of the housing 2. The diameter of the lens 1 is the same as the internal diameter of the member 15 and is rigidly held in position within the latter by means of threaded rings 19 and 20 which are provided on the opposite sides of the lens 1 and screw into the member 15. Suitable notches or holes, not shown, may be provided for screwing the rings 19 and 20 in and out. The rings 19 and 20 are also threaded internally to prevent reflections from these parts to the thermopile 4.

The lens 1 concentrates radiant energy upon the hot junctions of the thermopile through a field-limiting aperture 21 in the sub-housing 3 immediately in front of the thermopile 4 and through an adjustable calibrating diaphragm 22. The calibrating diaphragm 22 is comprised of a circular opening or aperture formed in an internally threaded cap which fits over a threaded projection provided on the sub-housing 3, the threads on the cap engaging the threads on said projection. The sensitivity of the pyrometer may be adjusted by manipulation of the calibration diaphragm 22 by means of a pinion 23, the slotted stem 24 of which may be reached through the terminal compartment 6 by means of a screw driver. As shown, the cap in which the diaphragm 22 is formed is provided with a gear section which is disposed in cooperative relation with the pinion 23 so that as the pinion 23 is rotated the cap is also rotated to thereby vary the distance between the aperture in the cap and the thermopile 4.

Reflections are prevented from reaching the sensitive elements of the thermopile 4 by the configuration of the stepped form of the inner surface of the front end of the sub-housing 3 and by the presence of the diaphragm 22. Specifically, the presence of the diaphragm 22 prevents any reflections from the inner wall of the housing 2 from entering the aperture 21. The stepped form of the inner surface of the front end of the sub-housing 3 permits the cross-section of the said front end to be sufficiently great to exhibit good thermal conduction characteristics for insuring uniformity of temperature throughout the sub-housing 3 while at the same time preventing any reflections from the inner wall of the housing 2 from entering the aperture 21. The provision of the stepped walls ensures the condition that any reflection of heat rays from one of the cylindrical stepped walls will be intercepted by the adjacent radial surfaces.

Figure 2:
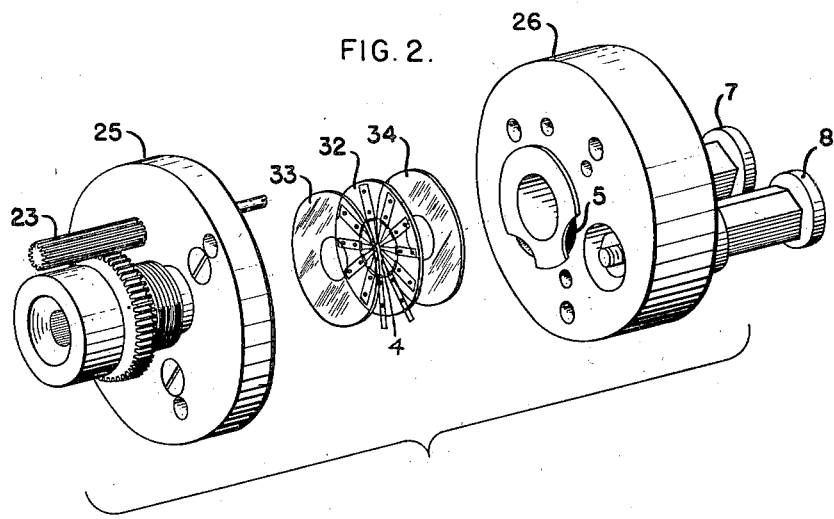
Fig. 2 is an exploded view of the thermopile housing included in the radiation pyrometer shown in Fig. 1.

The thermopile housing 3, shown in detail in Fig. 2, is comprised of two separate sections 25 and 26. In Fig. 2 the sections have been separated in order to show the thermopile 4 and the compensating winding 5, and in addition, the thermopile 4 and the insulating washers therefor have been shown separated in order to facilitate understanding of the thermopile construction. The ambient temperature compensating winding 5 is so arranged as to insure thermal equality with the thermopile housing 3 at all times. The compensating winding 5 is comprised of resistance wire having a substantial temperature coefficient of resistance such, for example, as nickel resistance wire, and is connected in shunt to the terminals of the thermopile 4.

The sections 25 and 26 of the thermopile housing 3 are normally held in close engagement with each other by means of three screws 27, one of which is shown in Fig. 1, which extend through holes in both of the sections 25 and 26 and fit into threaded holes provided in the external housing 2.

Sealed windows 28 and 29 are provided in the thermopile housing 3 and in the back cover plate 9, respectively, for facilitating sighting of the pyrometer upon any desired object the temperature of which it is desired to ascertain. Either or both of the windows 28 and 29 may be in the form of lenses which, if desired, may be magnifying lenses to further facilitate sighting of the pyrometer upon the said object.

Figure 3:
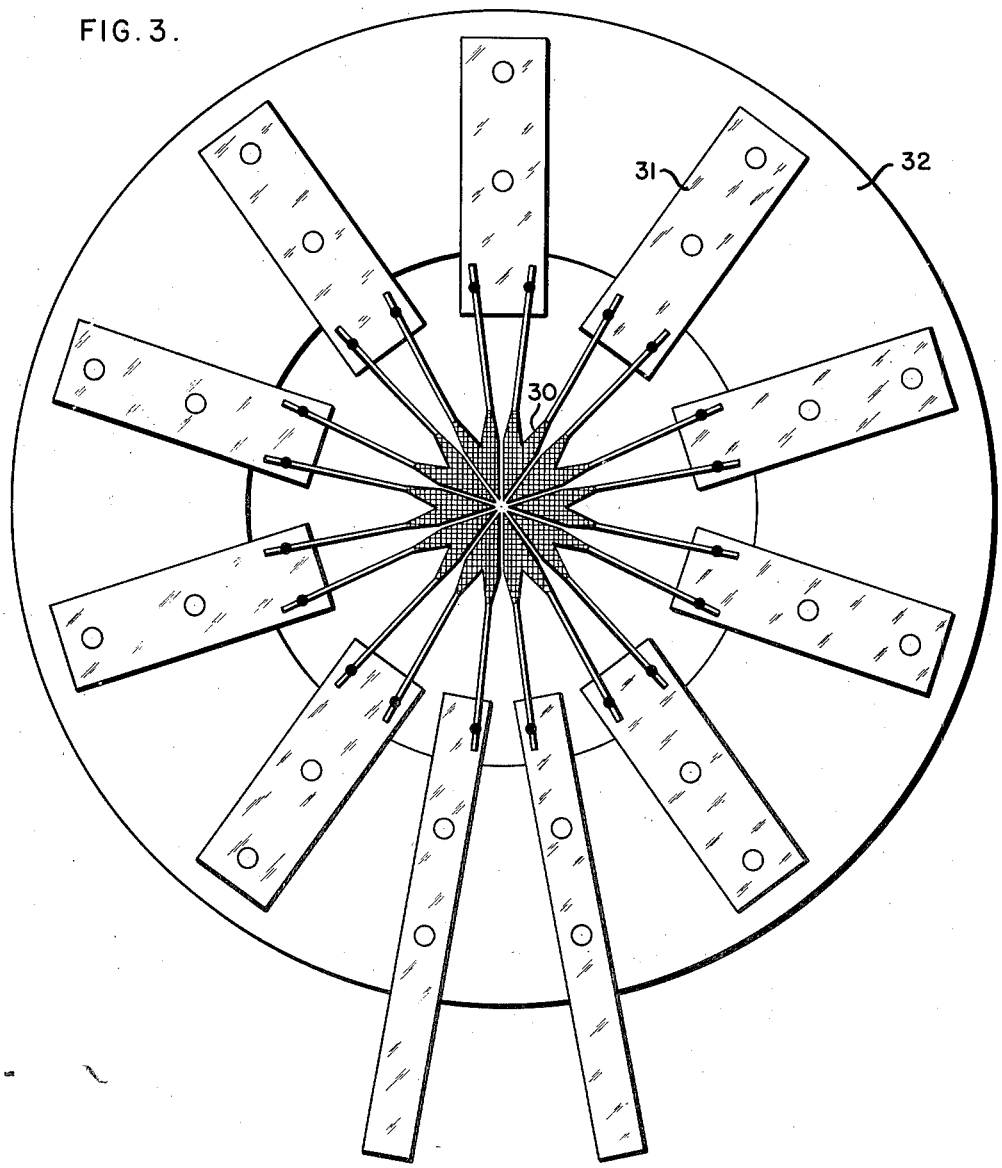
Fig. 3 is an enlarged view illustrating in detail the thermopile shown in Figs. 1 and 2.

A view of the thermopile 4 which is enlarged in relation to the other parts is shown in Fig. 3. The thermopile 4, as shown, consists of ten V-shaped thermocouples 30 which are spot-welded to a terminal assembly consisting of eleven flat metal strips 31. The flat strips of metal 31 are spaced radially at regular intervals around an annular sheet of mica 32. The hot junctions of the thermocouples 30 are flattened and are spaced around the center of the mica disc 32 and form the radiation receiver of the thermopile 4. The flattened hot junctions of the thermocouples 30 are blackened on the side which is exposed to the lens 1 with Aquadag, a colloidal graphite suspension, and thereafter are smoked as, for example, by means of a match to provide a surface which will readily absorb substantially all of the incident radiation. The other side of the radiation receiver is not treated, and therefore, presents a more or less shiny surface. The cold junctions of the thermocouples 30 are located at the points of attachment thereof to the metal strips 31.

The flat strips 31 may desirably be composed of the metal known as constantan and are fastened to the mica sheet 32 by flattened over extrusions formed in the strips 31 and which extend through suitable openings provided in the mica sheet 32. This arrangement for constructing the thermopile 4 provides a thermopile consisting of a single unit which is both rugged and rigid, and in addition, which may be readily manufactured at low cost.

The thermopile 4 is sandwiched between two other annular mica discs 33 and 34, and this arrangement is clamped between the front and rear parts 25 and 26 of the thermopile housing 3, the parts being drawn firmly into contact with each other over the large surface area outside of the thermopile 4. The parts 25 and 26 of the thermopile housing 3 are composed of material having high thermal conductivity such as aluminum, made thick to insure temperature equality throughout their mass. The thin, flat, cold junction strips 31 have very low heat capacity and are exposed to the thermopile housing parts 25 and 26 over relatively large areas through the mica sheets 33 and 34. The mica sheets 33 and 34 are made thin in order to insure continuous temperature equality between the flat, cold junction strips 31 and the thermopile housing 3. The chamber 35 within the thermopile housing 3 and in which the thermopile 4 is located is small enough to eliminate convection air currents and to minimize the time for the air contained within the chamber 35 to assume a state of equilibrium with respect to the thermopile housing 3. As shown in Fig. 3, the thermocouple wires are made relatively short and are so chosen as to provide the desired conduction factor.

The use of relatively short thermocouple wires chosen to provide the proper conduction factor and the absence of any extra material for use as a radiation receiver in conjunction with a thermopile housing 3 constructed as described combine to insure that the hot junctions of the thermopile as well as the cold junctions thereof will respond completely to changes in the thermopile housing temperature with such rapidity that transient errors are made negligible while the body of the pyrometer including the thermopile housing 3 is undergoing a change of ambient temperature.

Fig. 4 is a view from the rear of the preferred form of a radiation pyrometer embodying the features of the present invention with the terminal compartment cover 9 removed. This view shows the terminals 7 and 8 and the rear of the thermopile housing 3.

Figure 5:
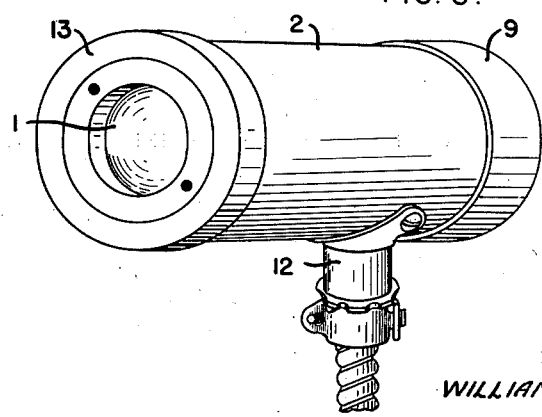

Fig. 5 is a view from the front and side of the radiation pyrometer. The mounting flange 13 provided at the front adapts the instrument for use with any one of a group of accessories suited to various industrial applications. The mounting ring 14, as shown in Fig. 1 and referred to in connection with the latter, is useful in conjunction with such mounting accessories.

Figure 6:
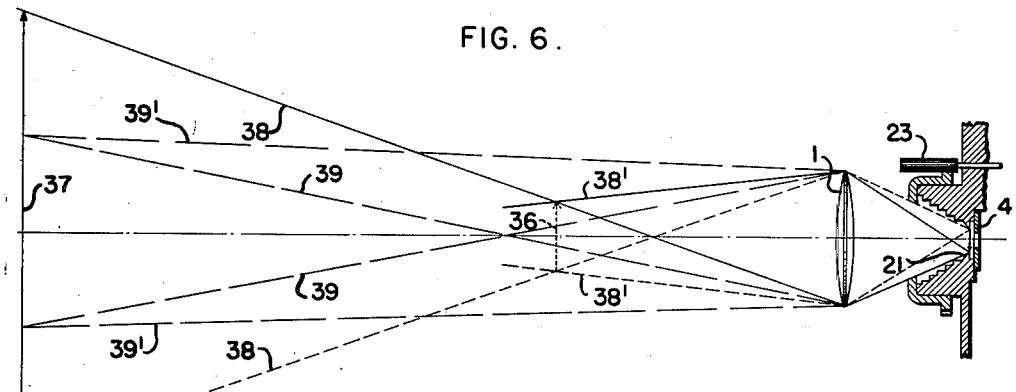
Fig. 6 illustrates schematically the field of view of the radiation pyrometer of Figs. 1–5 when lenses of different focal length are employed.

In Fig. 6 I have illustrated, more or less diagrammatically, the manner in which radiant energy from an object whose temperature is to be measured is converged on the thermopile 4 by means of the lens 1 where the focal length of the latter is relatively short and thus permits "wide-angle" measurements to be made. Fig. 6 illustrates the aperture 21 and an imaginary object, shown as a dotted arrow 36, located at the conjugate foci of the lens 1.

Radiant energy emanating from object 37 and passing through the imaginary object 36 will accordingly be condensed by the lens 1 and caused to pass through the aperture 21, and therefore, impinge on the hot junctions of the thermopile 4 in the same manner as if the same radiant energy had originated at the imaginary object 36. Under these conditions of use the lens does not form a clear image of details on the surface 37 at the aperture 21, but this fact does not influence the heating effect of the surface 37 upon the hot junctions of the thermopile 4, so long as the heated object 37 completely fills the cone of rays 38.

It will be noted that the angle of view of the thermopile 4 has been expanded to the limits indicated by the lines 38 whereby for any predetermined lens position, as shown in Fig. 6, the field of view of the thermopile is much greater than would be possible of attainment by so selecting the lens that the aperture 21 and the source 37 would be at conjugate foci. This will be recognized from the fact that the relative dimensions of the object and image formed by a lens are in the proportion of the distance from the object to the lens and the distance from the lens to the image. Accordingly, only that portion of the source 37 which is included between the dashed lines 39 can be condensed and passed through the aperture 21 and impinged upon the hot junctions of the thermopile 4 by a lens having the object 37 and the aperture 21 at its conjugate foci and located at the same position as the lens 1.

A further advantageous feature obtained by means of the utilization of a relatively short focal length lens 1 having its conjugate foci at imaginary image 36 and aperture 21 is illustrated in Fig. 6. Since no radiant energy emanating from any source outside of the boundary defined by lines 38 and 38' can reach the thermopile 4, the walls of a furnace may occupy any space external to these lines, and therefore, in the vicinity of the imaginary object 36, the opening in the furnace wall need be only slightly greater than the object 36.

In certain practical applications it may be desired to provide a water jacket or other radiation pyrometer accessory in the region of dotted line 36, thus permitting such accessories to have a minimum internal diameter, and accordingly offering the maximum obtainable protection for the pyrometer.

On the other hand, if a lens of longer focal length were used and placed in the position occupied by lens 1, its conjugate foci would be at aperture 21 and object 37, and under no condition can the opening in the furnace wall be smaller than the distance between the dashed lines 39'. When such a lens is employed, the instrument is a so-called "narrow-angle" radiation pyrometer, the angle being defined by the extension of the dashed lines 39 extended to location 37.

In some applications, it is desired to measure the temperature of objects whose dimensions are small compared with the dimensions of the radiation pyrometer. According to well known practice in the art, the object whose temperature is to be measured and the aperture in front of the thermopile should be located at the conjugate foci of the lens and the distance from the object to the lens should be comparable to the distance between the aperture and the lens. Reference to Fig. 6 shows that the location of the imaginary object 36 fulfills this condition so that if a real radiant energy source were located at 36, its dimensions need be no larger than the dimensions illustrated for the dotted line 36. Thus, the radiation pyrometer of my invention may be utilized to measure the temperature of a small object placed suitably close to the lens 1. This additional feature is incorporated in the same instrument which exhibits the "wide-angle" characteristic.

Thus, by proper selection of the focal length of the lens 1, the instrument may be readily converted from a "narrow-angle" to a "wide-angle" radiation pyrometer, and in addition, may also be utilized for the purpose of measuring the temperatures of small objects, if so desired. Such conversion moreover, is effected without involving any change in calibration of the pyrometer. Therefore, the radiation pyrometer of my invention is universally adapted to fulfill the requirements of a wide range of applications.

The features of constancy of calibration and the use of the same pyrometer housing are practically important and are accomplished by utilizing lenses of the same diameter located in substantially the same position and having similar absorption characteristics.

An important advantage of limiting the field of view by the aperture 21 immediately in front of the thermopile rather than by a fixed aperture located at position 36 of Fig. 6, as is employed in certain prior art fixed focus radiation pyrometers, is that local temperatures of substances outside of the limiting lines 38 and 38' cannot affect the reading of the pyrometer. With such prior art fixed focus pyrometers, radiant energy emanating from the walls of the limiting diaphragm, which becomes heated by exposure to the direct radiation from the hot object under measurement, impinge upon the hot junction of the thermopile and affect its reading accordingly. It is noted that in certain instances the plane of line 36 in Fig. 6 must occupy a position part way through the furnace wall where the temperatures involved will not permit the location of the limiting diaphragm of the prior art fixed focus pyrometer. These disadvantages of the prior art radiation pyrometers are eliminated in the radiation pyrometer of my invention where the plane of line 36 and the front end of the pyrometer are physically separated.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claim, and that in some cases certain features of this invention may sometimes be used to advantage without a corresponding use of other features.

Having now described my invention, what I claim as new and desire to secure by Letters Patent is:

A radiation pyrometer operable to measure the temperatures of objects through a range of different angular fields of view without involving any change in calibration including a thermopile, a lens having a focal length according to the desired angular field of view for converging heat rays upon said thermopile from the object whose temperature is under measurement, and a limiting diaphragm located between said lens and said thermopile for limiting the solid angle through which heat rays may be received by said thermopile, the relative positions of said lens, diaphragm and thermopile being substantially fixed and the distance between said diaphragm and said lens being greater than the focal length of said lens by such an amount that the conjugate focal point of said lens will be materially closer to the lens than the object from which said heat rays originate and the cross-sectional area at said conjugate focal point through which heat rays are received is materially smaller than the diameter of said lens.

WILLIAM H. WANNAMAKER, Jr.

REFERENCES CITED

The following references are of record in the file of this patent:

UNITED STATES PATENTS

| Number | Name | Date |
| --- | --- | --- |
| 1,533,740 | Keinath | Apr. 14, 1925 |
| 2,232,594 | Dike | Feb. 18, 1941 |
| Re. 19,564 | Quereau | May 7, 1935 |
| 1,474,903 | Hase | Nov. 20, 1923 |
| 1,475,365 | Schueler et al. | Nov. 27, 1923 |
| 1,734,837 | Thwing | Nov. 5, 1929 |
| 2,184,169 | Sordahl | Dec. 19, 1939 |
| 409,927 | Clements | Aug. 27, 1889 |
| 1,127,720 | Lemaire | Feb. 9, 1915 |
| 2,042,815 | White | June 2, 1936 |
| 2,074,641 | Clark | Mar. 23, 1937 |
| 1,788,849 | Schunemann | Jan. 13, 1931 |

FOREIGN PATENTS

| Number | Country | Date |
| --- | --- | --- |
| 135,064 | Germany | Nov. 25, 1902 |
| 90,643 | Austria | Jan. 10, 1923 |

OTHER REFERENCES

Harrison et al., Rev. Sc. Insts., vol. 12 (1941), pages 28–9.

Marsh, K., A. S. M. Metals Handbook (1939), pages 306–7.

Burgess et al., Bull. Bur. Standards, vol. 12 (1916), pages 96–98, 138, 139.

Philpot, A. J., Jour. Sc. Insts., vol. 3 (1926), page 367.

Hartenheim, M., "Instruments," vol. 1 (1928), page 444.

Robertson, J. K., Introduction to Physical Optics (1929), pages 80, 81.

Hardy and Perrin, Principles of Optics (1932), pages 409–411, 421, 422.

Behar, M. F., "Instruments," November 1940, page 358.

Jacobs, D. H., Fund of Optical Engineering (1943), pp. 11 and 46.